April 25, 1967 W. E. ROSS, JR., ET AL 3,315,795
LOADER CONVEYOR SYSTEM
Filed May 13, 1966 4 Sheets-Sheet 1
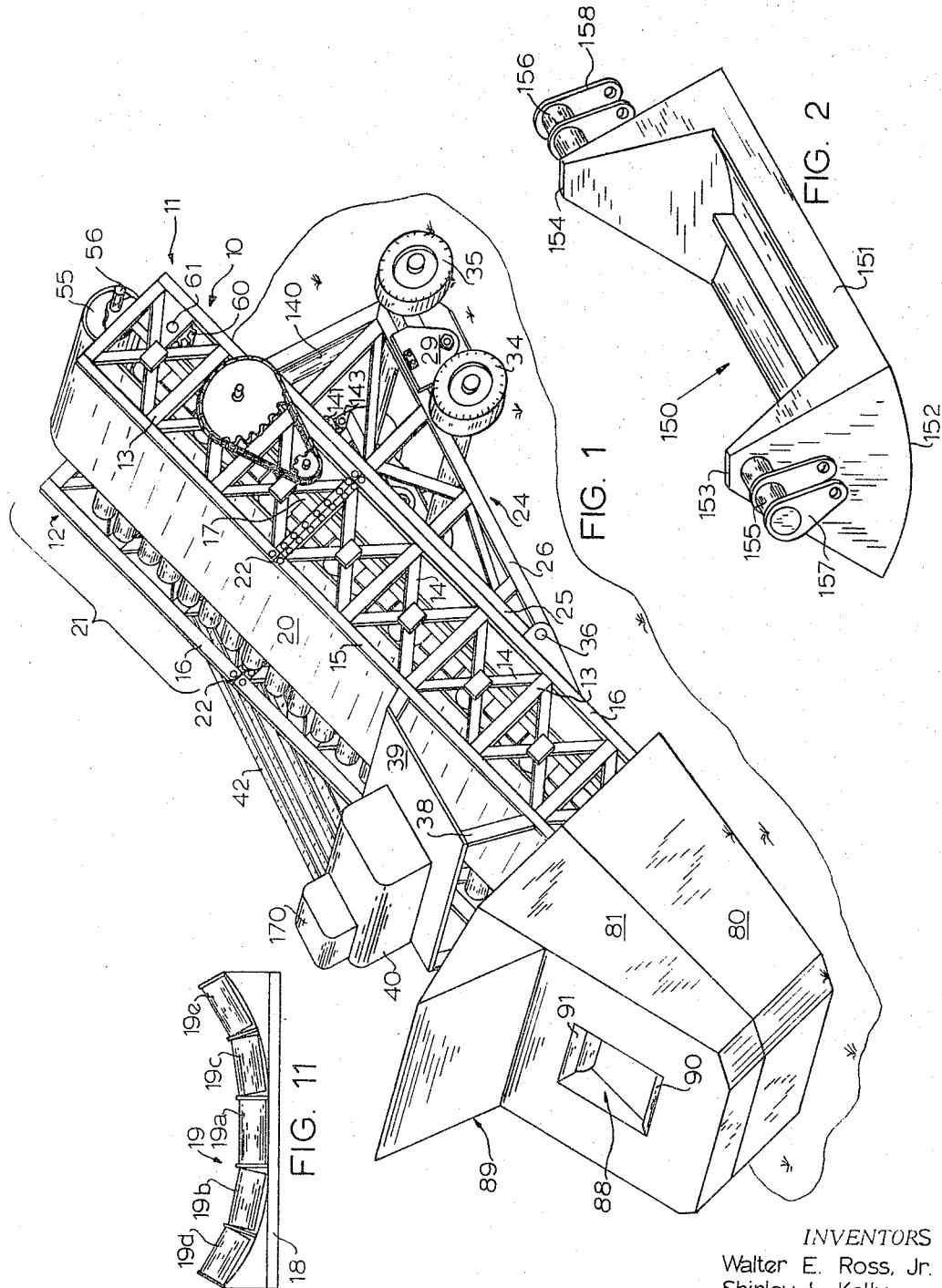
INVENTORS
Walter E. Ross, Jr.
Shirley L. Kelly
BY
B. B. Olm
ATTORNEY

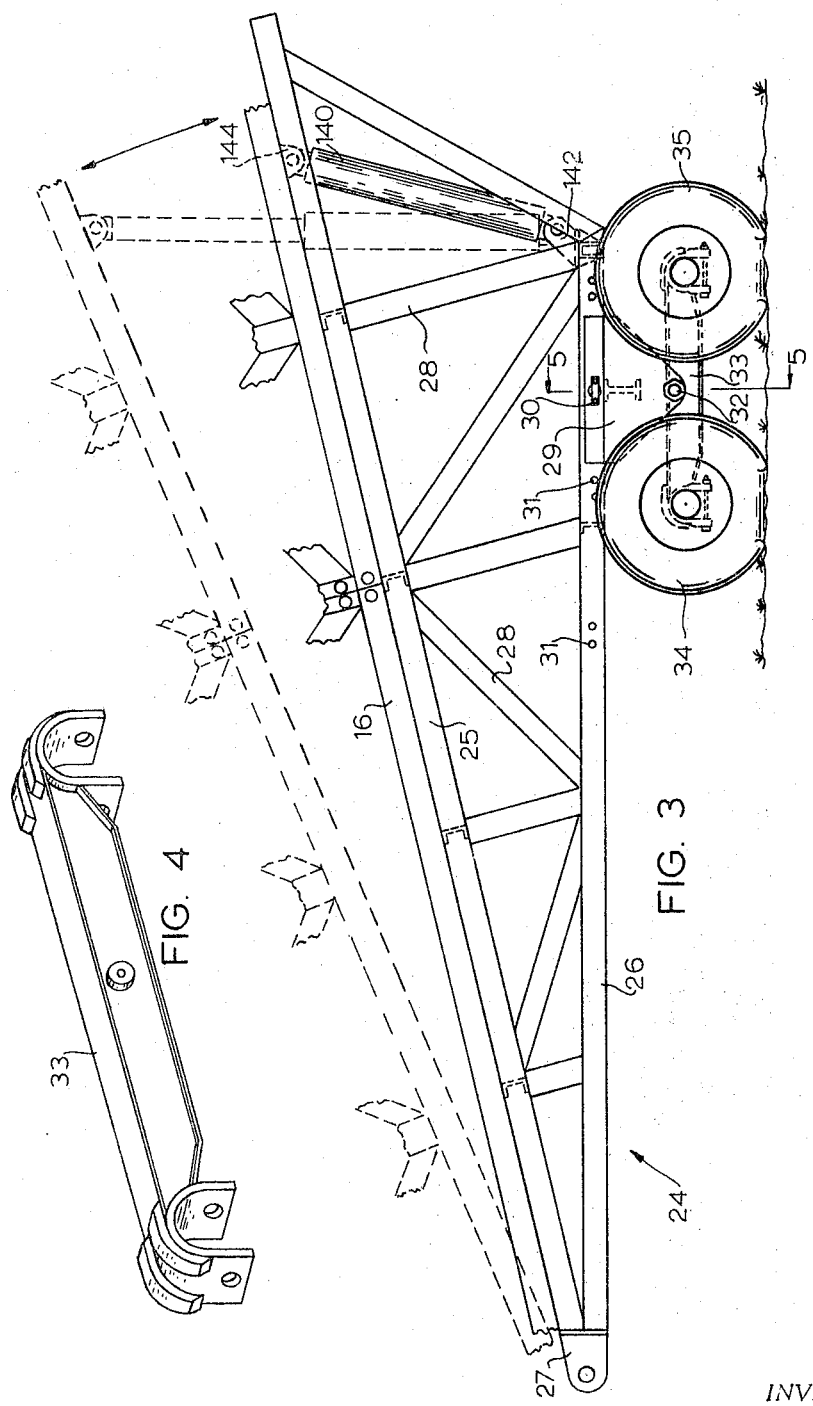

April 25, 1967  W. E. ROSS, JR., ET AL  3,315,795

LOADER CONVEYOR SYSTEM

Filed May 13, 1966  4 Sheets-Sheet 3

INVENTORS
Walter E. Ross, Jr.
Shirley L. Kelly
BY
B. B. Olm
ATTORNEY

April 25, 1967  W. E. ROSS, JR., ETAL  3,315,795
LOADER CONVEYOR SYSTEM
Filed May 13, 1966  4 Sheets-Sheet 4
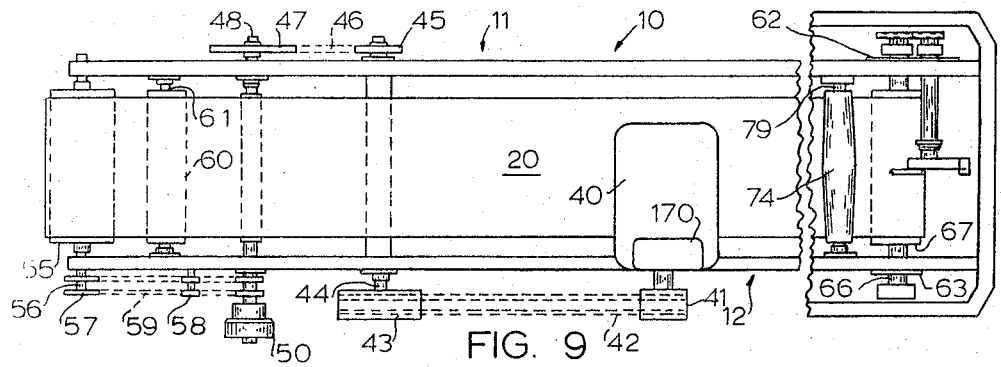
FIG. 9
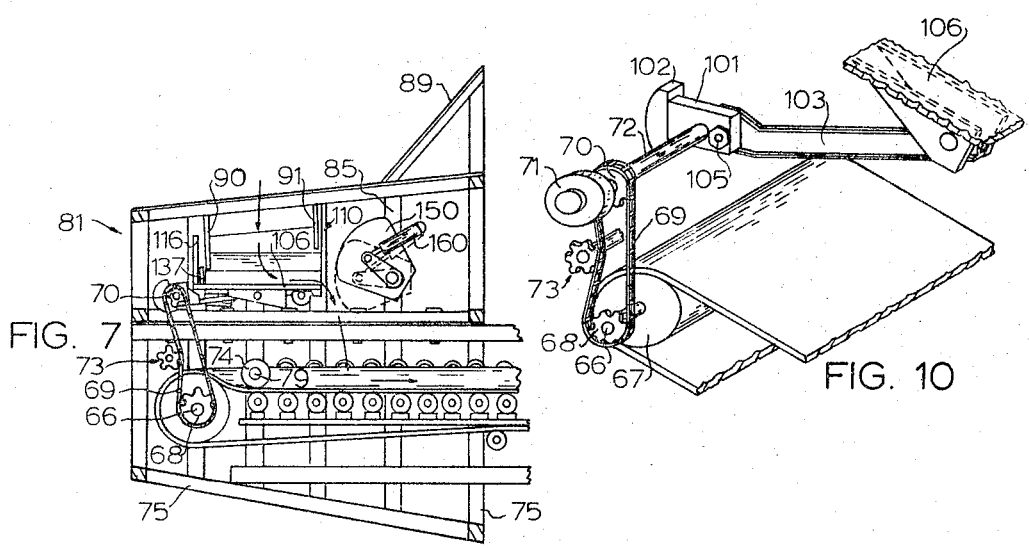
FIG. 7
FIG. 10
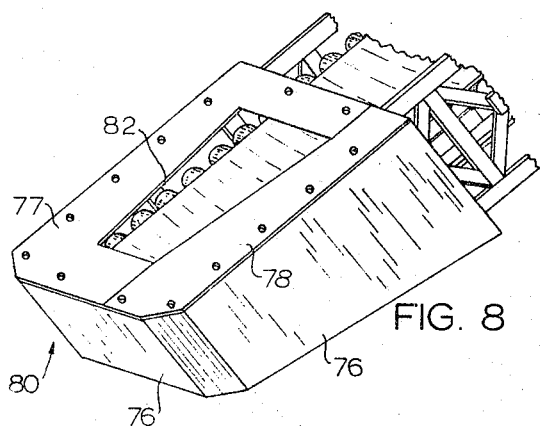
FIG. 8
INVENTORS
Walter E. Ross, Jr.
Shirley L. Kelly
ATTORNEY great # United States Patent Office 3,315,795
Patented Apr. 25, 1967

3,315,795
LOADER CONVEYOR SYSTEM
Walter E. Ross, Jr., Raleigh, and Shirley L. Kelly, Durham, N.C., assignors to Athey Products Corporation, Raleigh, N.C., a corporation of Illinois
Filed May 13, 1966, Ser. No. 550,006
11 Claims. (Cl. 198—233)

This invention relates to loader conveyors for handling granular materials and, more particularly, to a loader conveyor adapted to employ a reciprocating force feeder for loading rock and the like but which is readily converted into a gravity feeder for loading sand and the like.

Loader conveyors contemplated by this invention are portable and have an elongated, comparatively narrow frame supporting an endless belt conveyor or the like and a trap housing for disbursing bulk earth material onto the endless conveyor belt. Such conveyors are used in many ways for moving materials in quarries, gravel pits, mining operations and the like where it is desirable to transfer the materials from a source into an earth-moving vehicle or onto a second conveyor assembly. The conveyors are frequently moved about on the job from source to source and transported between jobs by attaching the same to a prime mover. On the job, the trap housing of the conveyor is positioned adjacent to or in a source of earth material and dozers or the like push the earth material onto the top surface of the trap housing where by gravity it falls through an opening therein and onto a moving conveyor belt.

To be economically competitive with shovels and other earth-moving equipment, the loader conveyor must be adapted to handle clay, sand, muck, rock and medium size boulders. Rocks and boulders are best handled with a force feed mechanism while free-flowing material such as sand and mechanically unfeedable material such as clay or muck are best handled by a gravity system. To date, there are no loader conveyors which are adapted to handle efficiently the rock-boulder earth material and, alternatively, the clay-sand material. Therefore, an object of this invention is to provide a loader conveyor which is adapted to handle coarse earth material and, alternatively, fine earth material.

Another object of this invention is to provide a loader conveyor system having an extensible frame for supporting an endless conveyor belt.

A further object of this invention is to provide a reciprocating trap feeder arrangement which is removably mounted over a gravity trap opening.

A still further object of this invention is to provide a loader conveyor with a reciprocating trap feeder which can be adjustably positioned with respect to the conveyor belt support frame whereby the quantity of earth material being fed onto the endless conveyor is varied according to the position of the reciprocating feeder.

Yet another object of this invention is to provdie a rigid undercarriage structure which is pivotally connected to and supports a conveyor frame assembly with hydraulically operated lift cylinders which are adapted to pivotally tilt the conveyor frame relative to the undercarriage structure.

Other objects and advantages of this invention will become apparent when the following detailed description is read in conjunction with the appended drawings, specification and claims. A preferred embodiment of this invention will now be described with reference to the accompanying drawings, in which:

FIGURE 1 is a perspective view of the loader conveyor showing the same in a normal operating position;

FIGURE 2 is a perspective view of a radial gate which is mounted in the trap housing and which in combination with the reciprocating bottom surface of the feeder box controls the flow of material onto the endless conveyor belt;

FIGURE 3 is an elevation view of the undercarriage structure which supports the loader conveyor and adapts the same for movement over a ground surface;

FIGURE 4 is a perspective view of the walking beam structure;

FIGURE 7 is an elevation sectional view taken along lines 7—7 of FIGURE 6 and showing the structure for mounting the reciprocating bottom surface;

FIGURE 8 is a perspective view of the gravity trap housing showing the same adapted to gravity feed the endless conveyor belt with sand or clay material;

FIGURE 9 is a plan view of the loader conveyor showing the power train used for driving the endless conveyor belt and for reciprocating the bottom surface of the feeder box;

FIGURE 10 is a perspective view showing the power linkage which is connected to the rear conveyor drum and which drives the reciprocating bottom plate; and FIGURE 11 is an elevation view of a laterally extending joist mounting a plurality of rollers.

Figure 5:
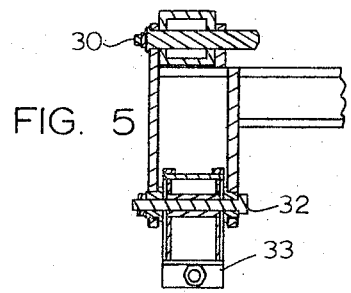
FIGURE 5 is a partial section view taken along lines 5—5 of FIGURE 3 and showing the arrangement whereby the walking beam structure may be moved laterally along the lower support members of the undercarriage structure.
Figure 6:
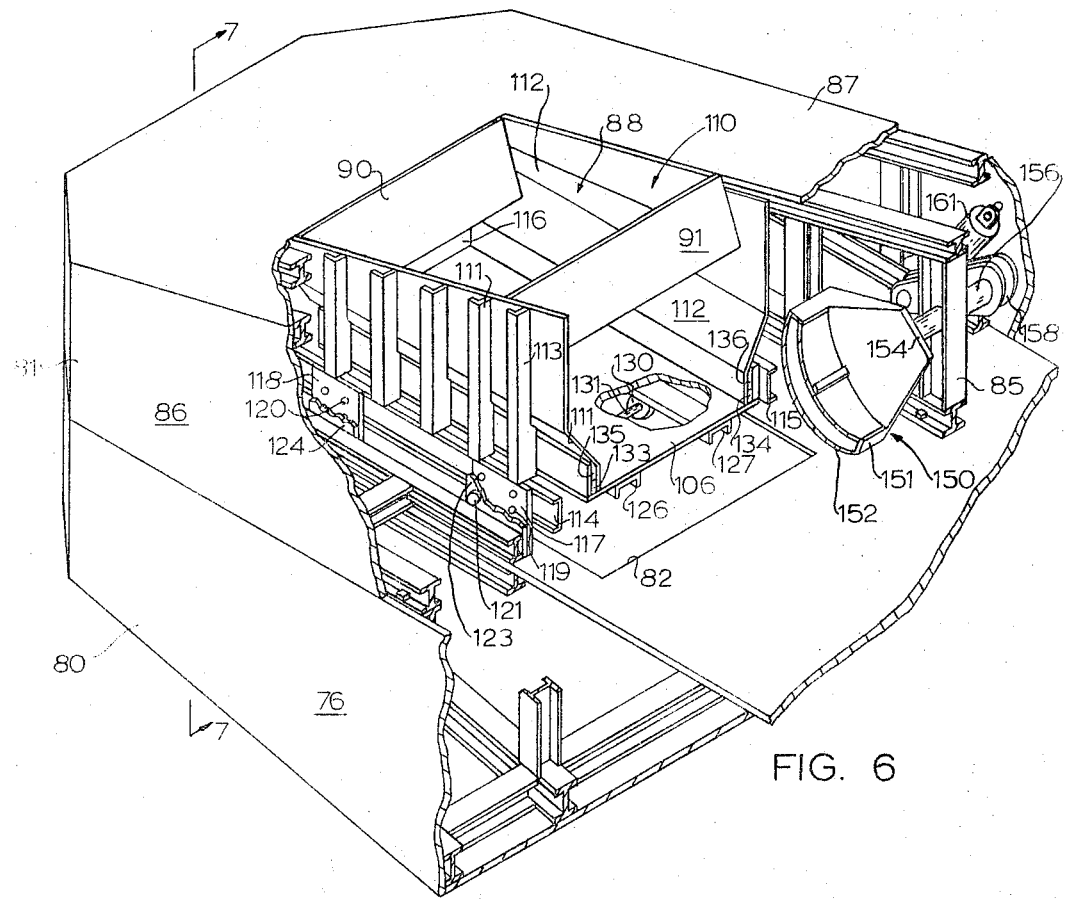
FIGURE 6 is a partial perspective cutaway view of the trap housing and feeder box mechanism which positively feeds the earth material onto the endless conveyor belt.

One embodiment of the present invention contemplates supporting an elongated, comparatively narrow conveyor frame by means of an undercarriage structure which includes a pair of axles mounting wheels on the ends thereof. The conveyor frame includes a plurality of laterally spaced rollers which are adapted to support and move an endless conveyor belt along a predetermined track. One end of the frame which is positioned relatively close to the ground surface is encompassed by a composite trap housing which receives the earth material and deposits the same onto the endless conveyor belt. The composite trap housing is comprised generally of a gravity feed trap housing and a force feed trap housing with the force feed trap housing being removably positioned on and supported by the gravity feed trap housing. The gravity feed trap housing is comprised of a covered frame structure which is integrally connected to the conveyor frame. The top cover plate of the gravity trap housing is provided with an elongated trap opening through which the incoming earth material passes before being deposited onto the endless conveyor belt.

The reciprocating trap housing includes a frame structure whose sides are covered and whose top forms an upper opening which is positioned in communication with the elongated trap opening of the gravity feed trap housing. The force feed trap housing adapted to reside on and be securely bolted to the gravity housing and includes a bang board which is removably mounted forwardly with respect to the upper opening therein and which prevents the earth material from spilling over the forward edge of of the reciprocal trap housing and onto the ground or the endless conveyor belt which is positioned beneath the same. A feeder box is adjustably mounted in the reciprocating trap housing below the opening in the top thereof and receives the incoming earth material. The feeder box is provided wtih a reciprocating bottom surface which shakes the incoming earth material at a constant rate onto the endless conveyor belt. The reciprocating bottom surface of the feeder box is driven by means of a power take-off linkage which is connected to a lower drum that is rotated by and partially supports the endless conveyor belt. By mounting the feeder box and its supporting structure and drive mechanism in the force feed trap housing, the force feed trap housing, including the feeder box and drive mechanism, may be removed from its position of resting on the gravity feed trap housing simply by unbolting the force feed and gravity housings and disconnecting the power take-off linkage thus adapting the gravity feed trap housing to receive the earth material directly from a source.

The invention is illustrated in connection with the accompanying drawings, in which the figures are illustrative of the preferred embodiment of the invention.

Conveyor frame 10 is comprised of left and right side portions 11 and 12, each of which includes upper and lower beam members 15 and 16. Beam members 15 and 16 form integral rigid structure by means of perpendicularly arranged braces 13 and trusses 14 which are integrally connected to each other and to beam members 15 and 16. Both left and right side portions 11 and 12 are each provided with an elongated boom member 17 which is parallel to upper and lower beam members 15 and 16 and which is connected to and supported by braces 13 and trusses 14. Left and right side portions 11 and 12 are rigidly interconnected by means of laterally extending joists 18 which are integrally connected to the respective boom members 17. Joists 18 support a plurality of rollers 19 which are arranged in a depressed manner so as to allow an endless conveyor belt 20 to be shaped substantially in a concave configuration when passing over the same for conveying the earth materials upwardly. Referring to FIGURE 11, roller 19a is positioned substantially in a horizontal plane, rollers 19b 19c are inclined at angle of 20° with respect to the horizontal and rollers 19d and 19e are inclined aproximately 40° with respect to the horizontal.

Conveyor frame 10 is adapted to be extensible by providing the same with a detachable end portion 21. End portion 21 is connected to conveyor frame 10 along joint 22 and is held thereon by a nut and bolt arrangement indicated in FIGURE 1 at joint 22. To lengthen conveyor frame 10, end portion 21 is removed and a frame section (not shown), similar in design to conveyor frame 10, is mounted on conveyor frame 10, whereupon end portion 21 is replaced on the extending end of the added frame section.

Conveyor frame 10 is supported for transportation by means of an undercarriage structure 24. Undercarriage structure 24 is substantially a rigid frame and is comprised of converging beam members 25 and 26 which are joined at a vertex 27 and which are rigidly positioned with respect to each other by means of truss members 28. Vertex 27 is pivotally connected to conveyor frame 10 by pin means 36 so as to adapt conveyor frame 10 to be pivoted upwardly with respect to undercarriage structure 24. Beam member 26 has removably connected thereto a pair of axle support plates 29 which are selectively secured to the same by pins 30. A plurality of holes 31 are transversely spaced through beam member 26 and are adapted to receive pins 30 so that axle support plates 29 may be positioned at most any desired location along the length of beam member 26. Axle support plates 29 mount shaft 32 which pivotally receives walking axle 33. Walking axle 33 in turn has rotatably mounted thereon wheels 34 and 35. By selectively moving axle support plates 29 along the length of beam member 26, undercarriage structure 24 is adapted to balance and to raise and lower conveyor frame 10 for transportation purposes and to provide a strong foundation upon which conveyor frame 10 may reside. Undercarriage structure 24 may be provided with a pair of hydraulic cylinders 140 and 141 which are pivotally connected thereto by means of eyelets 142 and 143, respectively, and are pivotally connected to conveyor frame 10 by means of brackets 144 and 145, respectively (bracket 145 not shown). Hydraulic cylinders 140 and 141 are powered by a hydraulic source, hereinafter described, and are adapted to tilt conveyor frame upwardly relative undercarriage structure 24.

Suitably secured to conveyor frame 10 by means of supports 38 is a platform 39 upon which is mounted an internal combustion engine 40 having a V-belt drive cylinder 41. Drive cylinder 41 powers a plurality of V-belts 42 which in turn rotate pulley 43. Pulley 43 is mounted on one end of transverse shaft 44 which is rotatably supported by boom members 17 and which has mounted at its other end a sprocket 45. Sprocket 45 positively drives a flexible link chain 46 which in turn rotates sprocket 47 that is mounted on one end of shaft 48. Shaft 48 is rotatably supported by boom members 17 and has mounted at its other end a clutch arrangement 50. Upper drum 55 is mounted by suitable means on the ends of boom members 17 by shaft 56 and clutch arrangement 50, when connected, drives drum 55 by means of sprocket 57. A chain tensioning device 58 is mounted on side portion 12 between pulley 57 and clutch 50 in order to tension chain 59 which links clutch 50 with pulley 57. The rotating speed of drum 55 is much slower than the rotating speed of V-belt drive cylinder 41 for each positively driven pulley or cylinder has a substantially smaller circumference than does its connected driven pulley. A cleaning roller 60 is rotatably mounted on conveyor frame 10 by means of shaft 61 adjacent drum 55 over which passes conveyor belt 20 and functions to clean conveyor belt 20 and to provide drum 55 with a greater frictional surface for engaging and driving conveyor belt 20.

Attached to the lower portions of conveyor frame 10 near the end thereof are opposed bearing plates 62 and 63 which are respectively mounted in left and right side portions 11 and 12 and which have laterally extending slots, not shown, in which is journalled a shaft 66. Lower drum 67 is rigidly mounted on shaft 66 and is rotated by and supports conveyor belt 20. By having shaft 66 slidably mounted in the mentioned slots conveyor belt 20 may be tensioned by pulling rearwardly on drum 67 and by securing shaft 66 in the slots at the desired location.

A snub pulley 74 having a convexly shaped outer surface is mounted on shaft 79 which is rotatably journalled in left and right side portions 11 and 12 adjacent lower drum 67. As conveyor belt 20 tangentially leaves the periphery of lower drum 67, it engages and is forced into a concave shape by snub pulley 74 thus substantially assuming the outline as traced by the series of rollers 19. Shaft 66 has securely mounted on one end thereof a sprocket 68 which drives a flexible chain 69 which in turn drives a further sprocket 70. Sprocket 70 is attached to a clutch 71 which is mounted on a shaft 72. Flexible chain 69 is tensioned by a common tensioning means 73.

The lower end of conveyor frame 10 includes a gravity feed trap housing 80 which supports a removable force feed trap housing 81. Force feed trap housing 81 is securely positioned thereon by any convenient bolt means shown which may be easily removed when it is desirable to lift the same. Gravity feed trap housing 80 is comprised of a frame 75 which is integrally connected to conveyor frame 10 and which is enclosed by side walls 76 and a two piece top cover 77. Top cover 77 defines a diverging trapezoidal shaped opening 82 and includes a removable member 78 which bounds one diverging side of opening 82. When gravity feed trap housing 80 alone is to deposit bulk earth material onto conveyor 20, removable member 78 is placed in its respective postion as shown in FIGURE 8 and when force feed trap housing 81 is superimposed on gravity feed trap housing 80, removable member 78 is removed to allow flexible chain 69 to pass through the area vacated by removable member 78 and connect sprocket 68 with sprocket 70. Force feed trap housing 81 is comprised of frame members 85, side walls 86 and top cover 87. Top cover 87 has an opening therein 88 and forms at its forward portion a bang board 89 which is substantially triangular in shape. A pair of material guide members 90 and 91 are connected to top cover 87 along selected and opposite edges of opening 88 and extend inwardly into force feed trap housing 81 so as to guide the incoming earth material along a predetermined path.

Force feed trap housing 81 supports a shaft 72 in the rear portions thereof which has on its outwardly extending end clutch 71 which is connected to and driven by lower drum 67 by means of sprocket 70 and flexible chain 69. The other end of shaft 72 is substantially centered in force feed trap housing 81 and has mounted thereon a cam 101. Cam 101 includes a counterweight 102 and is rotatably connected to drive rod 103 opposite counterweight 102 by means of bolt arrangement 105. Drive rod 103 is pivotally connected to a movable plate 106 which founctions as the bottom of a feeder box 110. Feeder box 110 includes opposed side walls 111 and 112 and end wall 116 which are connected to and supported by structural members 113 which in turn are supported by lateral and spaced-apart channel members 114 and 115. Feeder box 110 is pivotally mounted within force feed trap housing 81 by pairs of forward and rear positioning plates 117 and 118 which are perpendicularly mounted on the forward and rear portions of channel members 114 and 115. Forward and rear positioning plates 117 and 118 are provided with a plurality of spaced holes 119 and 120, respectively, which are adapted to receive a bolt or the like 121 which extends through the same and into mating pairs of rigidly mounted forward and rear plates 123 and 124 which are securely attached to selected structural members 113.

Movable plate 106 is provided with longitudinal and parallel channel members 126 and 127 which are connected to the bottom surface thereof and open downwardly so as to be rollably mounted on wheels 130. Wheels 130 are selectively spaced and are rotatably mounted on a pair of parallel shafts 131 which are supported by and connected to channel members 114 and 115 of feeder box 110. Movable plate 106 is provided with longitudinally extending upright plates 133 and 134 which are positioneed substantially adjacent selected parallel edges thereof and are adapted to slide in passageways 135 and 136, respectively, which are defined by side walls 111 and 112. End wall 116 is provided with a flexible skirt 137 which extends downwardly therefrom and impinges against movable plate 106. Upright plates 133 and 134 and flexible skirt 137 combine to prevent the bulk earth material from escaping the confines of feeder box 110 except in the desired flow which is out the forward and open end thereof as indicated by arrows in FIGURE 7.

In reference to FIGURES 2 and 7, force feed trap housing 81 is provided with a radial gate 150 which is adapted to control the rate of flow of the bulk earth material through feeder box 110. Radial gate 150 is comprised of gate portion 151 which includes an arcuated outer surface 152, outwardly extending flanges 153 and 154, a pair of axially aligned and oppositely disposed shafts 155 and 156 which are mounted on and extend outwardly from the external surfaces of flanges 153 and 154, respectively, and latch members 157 and 158 which are respectively mounted on shafts 155 and 156. Shafts 155 and 156 are rotatably mounted in a selected pair of opposed frame members 85 and latch members 157 and 158 pivotally receive the piston ends of hydraulic cylinders 160 and 161 which have their other end pivotally connected to selected frame members 85 and which are powered by a hydraulic pump hereinafter to be described.

By extending the hydraulic pistons 162 and 163 of hydraulic cylinders 160 and 161, respectively, radial gate 150 is lowered into a position of blocking the flow of earth material through feeder box 110, thus any volume of material flow may be obtained.

A hydraulic pump 170 is mounted on top of engine 40 and is driven thereby. Hydraulic pump 170 supplies pressurized fluid through fluid lines (not shown) to hydraulic cylinder 140 and 141 which tilt conveyor frame 10 relative to undercarriage structure 24, to clutches 50 and 71 and to hydraulic cylinders 160 and 161 which position radial gate 150 relative feeder box 110. The hydraulic controls (not shown) for directing the flow and the amount thereof may be mounted on platform 39 or at any other convenient location.

In operation, the loader conveyor is pulled to the desired area by any vehicle means (not shown) whereupon the composite trap housing which is comprised of the force feed trap housing 81 and the gravity feed trap housing 80 is positioned adjacent the earth material and dozers or other earth-moving vehicles pile the earth material on the composite trap housing. The proper angle of inclination of conveyor frame 10 is set by energizing hydraulic cylinders 160 and 161 and the weight of conveyor frame 10 is more evenly distributed between the ground engaging composite trap housing and wheels 34 and 35 by moving the axle support plates 29 forwardly along beam members 25 and 26 and by inserting pins 30 in the selected holes 31. Diesel engine 40 is energized and powers conveyor belt 20 by driving pulley 43 which in turn rotates sprocket 45 by means of shaft 44 which in turn rotates shaft 48 by means of sprocket 47 and chain 46. After actuating clutch 50 by means of hydraulic pump 170, shaft 48 rotates shaft 56 by means of sprocket 57 and chain 59. Forward drum 55 which is rigidly mounted on shaft 56 frictionally engages endless conveyor belt 20 and pulls conveyor belt 20 along an endless track as defined by itself.

Where rocks and boulders are to be conveyed by this system, the force feed trap housing 81 is allowed to remain on and be securely fastened to the gravity feed trap housing 80. Feeder box 110 is adjusted by moving positioning plates 117 and 118 relative to rigidly mounted plates 123 and 124, respectively, and secured to the same by bolts 121. The angle at which feeder box 110 is declined toward inclined conveyor belt 20 is dependent upon the material to be handled by the system, the speed at which the material is to be handled, the opening between feeder box 110 and radial gate 150 and the position of the composite trap housing prior to adjustment. The earth material is fed by feeder box 110 through opening 82 and onto conveyor belt 20 by means of reciprocating movable plate 106. Movable plate 106 is reciprocated by drive rod 103 which is connected by a rotating cam 101. Thus, the circular motion of the cam is transferred into the linear motion of the movable plate 106. Cam 106 is mounted on shaft 100 which is powered by a take-off mechanism including sprockets and flexible chains which is connected to lower drum 67. Therefore, when lower drum 67 is rotated and clutch 71 is engaged, movable plate 106 is adapted to be reciprocated whereby the earth material is fed at a constant rate onto conveyor 20.

When sand and non-feedable material are to be moved by this system, gravity feed trap housing 80 is adapted to be employed by disconnecting flexible chain 69 from sprocket 70 and by removing force feed trap housing 81 therefrom. Removable member 78 is replaced on gravity feed trap housing 80 in its normal position in alignment with top cover 77. Since all of the mechanism involved in reciprocating movable plate 106 is connected to the force feed trap housing 81, there remains no structure to interfere with the gravity flow of the earth materials through opening 82 and onto conveyor 20 after force feed trap housing 81 has been removed.

While the preferred embodiment of the invention has been disclosed, it is to be understood that changes and variations may be made without departing from the scope and spirit of the invention as defined by the appended claims.

What is claimed is:

1. A loader-conveyor system for handling bulk material comprising an elongated conveyor means having a lower material receiving end and an upper material discharge end and adapted to move said bulk material from said material receiving end to said material discharge end; an undercarriage structure supporting said conveyor means and adapted to transport said conveyor means across a surface; and a composite trap housing for receiving and dispersing said bulk material onto said conveyor means, said composite trap housing comprising a substantially enclosed gravity feed trap portion being integrally combined with said conveyor means and encompassing said lower end thereof, said gravity feed trap portion having an opening above said lower end of said conveyor means through which pass said bulk materials, a force feed trap portion adapted to be removably mounted on and supported by said gravity feed trap portion and having side and top walls, said top wall having an opening positioned in alignment with said opening in said gravity feed trap portion, said force feed trap portion housing and adjustably supporting a feeder box means beneath said opening therein, said feeder box means having a reciprocating bottom wall positioned in communication with said opening in said force feed trap portion, said opening in said gravity trap portion and said conveyor means, and linkage means detachably connecting said conveyor means with said reciprocating bottom wall for imparting a reciprocating motion to the same whereby said bulk material is dispersed onto said conveyor means.

2. The loader-conveyor system of claim 1 wherein said elongated conveyor means is adapted to be extensible by providing the same with a removable end portion and an insert, said insert being mounted between said removable end portion and said conveyor means to lengthen the same.

3. The loader-conveyor system of claim 1 wherein said undercarriage structure includes a wheel borne axle, said axle adapted to support one end of said conveyor means in a normal working position and being movable into a position of balancing said conveyor means and said composite trap housing for the transportation thereof.

4. The loader-conveyor system of claim 1 wherein said linkage means detachably connecting said conveyor means with said reciprocating bottom surface includes a clutch supported by and mounted in said force feed trap portion whereby said conveyor means selectively powers said reciprocating bottom surface.

5. The loader-conveyor system of claim 1 wherein said undercarriage structure is substantially triangular in shape in the vertical plane and is comprised of upper and lower support members converging to form aligned vertexes, joist members interconnecting said upper and lower support members to form a rigid composite structure, said vertexes being pivotally attached to said elongated conveyor means at a point in proximity with said composite trap housing and said upper support members being adapted to contact and support said conveyor means along a selected portion of its elongated length, a wheel borne axle mounted on said lower support members and being movable to selected positions along the length of said lower support member to support said conveyor means in a normal working position and, alternatively, in a normal transporting position and hydraulic cylinder means pivotally mounted on said undercarriage structure and pivotally connected to said conveyor means for tilting said conveyor means relative said undercarriage structure about said vertexes.

6. The loader-conveyor system of claim 1 wherein said gravity feed trap portion includes a frame structure being integrally connected to said elongated conveyor means and substantially encompassing the lower end thereof, side walls enclosing portions of the vertical periphery of said frame structure and a top wall being comprised of a U-shaped flat member integrally connected to said frame structure and a flat removable member adapted to connect the ends of said U-shaped member and in combination with said U-shaped member to form said opening in said gravity feed trap portion and being removable when said force feed trap portion resides on said gravity feed trap portion whereby a passageway is provided for said linkage means to connect said conveyor means with said reciprocating bottom wall.

7. The loader-conveyor system of claim 6 wherein said linkage includes a cam rotatably mounted on a shaft in said force feed trap portion, a clutch mounted on said shaft, chain means connecting said clutch with said conveyor means and extending through said passageway provided by the removal of said flat removable member, a counterweight rigidly secured to one portion of said cam, a rigid bar member having one end rotatably mounted on said cam at a point being diametrically opposite to said counterweight and the other end pivotally connected to said reciprocating bottom wall whereby upon the energization of said clutch said reciprocating bottom wall is adapted to be reciprocated by said conveyor means.

8. The loader-conveyor system of claim 7 wherein said feeder box means is comprised of a framework supported by said force feed trap portion, a pair of parallel and spaced apart vertical side walls and a vertical end wall connecting said side walls, said side and end walls being supported by said framework, said side and end walls in combination with said reciprocating bottom wall forming an open topped open ended box, said pair of parallel side walls each being provided with a narrow passageway extending upwardly from its lower edge and running the length thereof and said end wall being provided with a flexible skirt on its lower end extending between said side walls, said reciprocating bottom wall adapted to maintain contact during the movement thereof with said flexible skirt and being provided with a pair of elongated upwardly extending flanges mounted respectively adjacent selected parallel edges and adapted to be received by and slide in said passageways in said side walls.

9. The loader-conveyor system of claim 8 wherein said reciprocating bottom wall is provided with a pair of longitudinally extending downwardly facing parallel channel rails mounted on its lower surface, shaft members supported by said framework, wheels rotatably mounted on said shaft members and spaced to rollably receive said channel rails whereby said reciprocating bottom wall is supported by and movable across said wheels.

10. The loader-conveyor system of claim 8 wherein said framework is provided with a pair of spaced apart forward and a pair of spaced apart rear vertical plates being integrally connected thereto, said plates being provided with a plurality of selectively spaced holes extending perpendicularly therethrough, pin means supported by said force feed trap portion and adapted to engage a selected hole in each of said forward and rear pairs of plates whereby said feeder box means may be adjustably tilted with respect to said force feed trap portion and pivot about the axis of said cam.

11. A loader-conveyor system for handling bulk material comprising
(a) an elongated conveyor having a lower material receiving end and an upper material discharge end and including a conveyor frame, a plurality of conveyor rollers laterally mounted in said conveyor frame, an endless conveyor belt rollably supported by said conveyor rollers and defining a path and means for positively driving a selected roller whereby said endless conveyor belt moves along said path and is adapted to carry said bulk material from said lower material receiving end to said upper material discharge end;
(b) an undercarriage structure supporting said elongated conveyor and adapted to transport said conveyor across a surface, said undercarriage structure comprising upper and lower support members converging to form aligned vertexes, joist members interconnecting said upper and lower support members to form a rigid composite structure being substantially triangular in shape in the vertical plane, said vertexes being pivotally attached to said conveyor frame at a point in proximity with said lower material receiving end, said upper support members being adapted to contact and support said conveyor frame along a selected portion of its elongated length, a wheel borne axle connected to said lower support members and being adjustably movable to selected positions along the length thereof and hydraulic cylinder means pivotally mounted on a selected joist at one end and pivotally connected to said conveyor frame at the other end for pivotally tilting said conveyor means relative said undercarriage structure about said vertexes; and (c) a composite trap housing comprising a gravity feed trap housing and a force feed trap housing adapted to be removably mounted on said gravity feed trap housing, (1) said gravity feed trap housing having a gravity frame structure being integrally connected to said conveyor frame and substantially encompassing said lower material receiving end, side walls enclosing portions of the vertical periphery of said gravity frame structure and a top wall being comprised of a U-shaped flat member integrally connected to the top of said gravity frame structure and a flat removable member resting on and covering a portion of the top of said gravity frame structure and in combination with said U-shaped member adapted to form an opening in the top of said gravity feed trap housing and being removable when said force feed trap housing resides on said gravity feed trap housing to provide a passageway between said housings; and (2) said force feed trap housing having a trap frame structure adapted to be removably mounted on said gravity feed trap housing, side walls substantially enclosing the vertical surfaces of said trap frame structure and a top wall having an opening positioned in alignment with said opening in said gravity trap housing, said force feed trap housing including a feeder box assembly, said feeder box assembly comprising:

(a) a framework having a pair of spaced apart forward and a pair of spaced apart rear vertical plates flanking the sides thereof, said plates being provided with a plurality of selectively spaced holes extending perpendicularly through the same, pin means mounted in said trap frame structure and adapted to engage a selected hole in each of said forward and rear pairs of plates whereby said framework may be adjustably tilted with respect to said force feed trap housing;

(b) a feeder box supported by said framework and having a pair of spaced apart and vertical side walls and a vertical end wall connecting said side walls, said side and end walls being mounted on said framework, said pair of parallel side walls each being provided with a narrow passageway extending upwardly from its lower edge and running the length thereof and said end wall having a flexible skirt on its lower edge extending between said side walls, laterally positioned shaft members supported by said framework, a plurality of rollers rotatably mounted on said shaft members and a reciprocating bottom wall adapted to maintain contact during the movement thereof with said flexible skirt and having a pair of opposed and vertically extending parallel flanges mounted on its upper surface adjacent selected parallel edges, said parallel flanges being adapted to be received by and slide in said passageways, said reciprocating bottom wall including a pair of longitudinally extending downwardly facing parallel channels mounted on its bottom surface and adapted to be supported by and be movable across said wheels; and (c) a power linkage having a shaft rotatably supported by said force feed trap frame structure, a clutch mounted on one end of said shaft, endless chain means connected to a selected roller mounted in said conveyor frame and being driven by said conveyor belt, said endless chain means being driven by said selected roller and extending through said passageway provided by the removal of said flat removable member and connected to said clutch to selectively power the same, a cam rotatably mounted on the other end of said shaft, a counterweight rigidly mounted on a peripheral portion of said cam and a rigid bar having one end rotatably mounted on said cam at a point being diametrically opposite to said counterweight and having the other end pivotally connected to said reciprocating bottom wall whereby upon the energization of said conveyor belt said reciprocating bottom wall is reciprocated by said linkage.

References Cited by the Examiner
UNITED STATES PATENTS
1,256,585  2/1918  Merriman _____ 198—56
2,621,777  12/1952  Tintes _____ 198—233

EVON C. BLUNK, *Primary Examiner.*

R. E. AEGERTHER, *Assistant Examiner.*